Patented Nov. 3, 1936

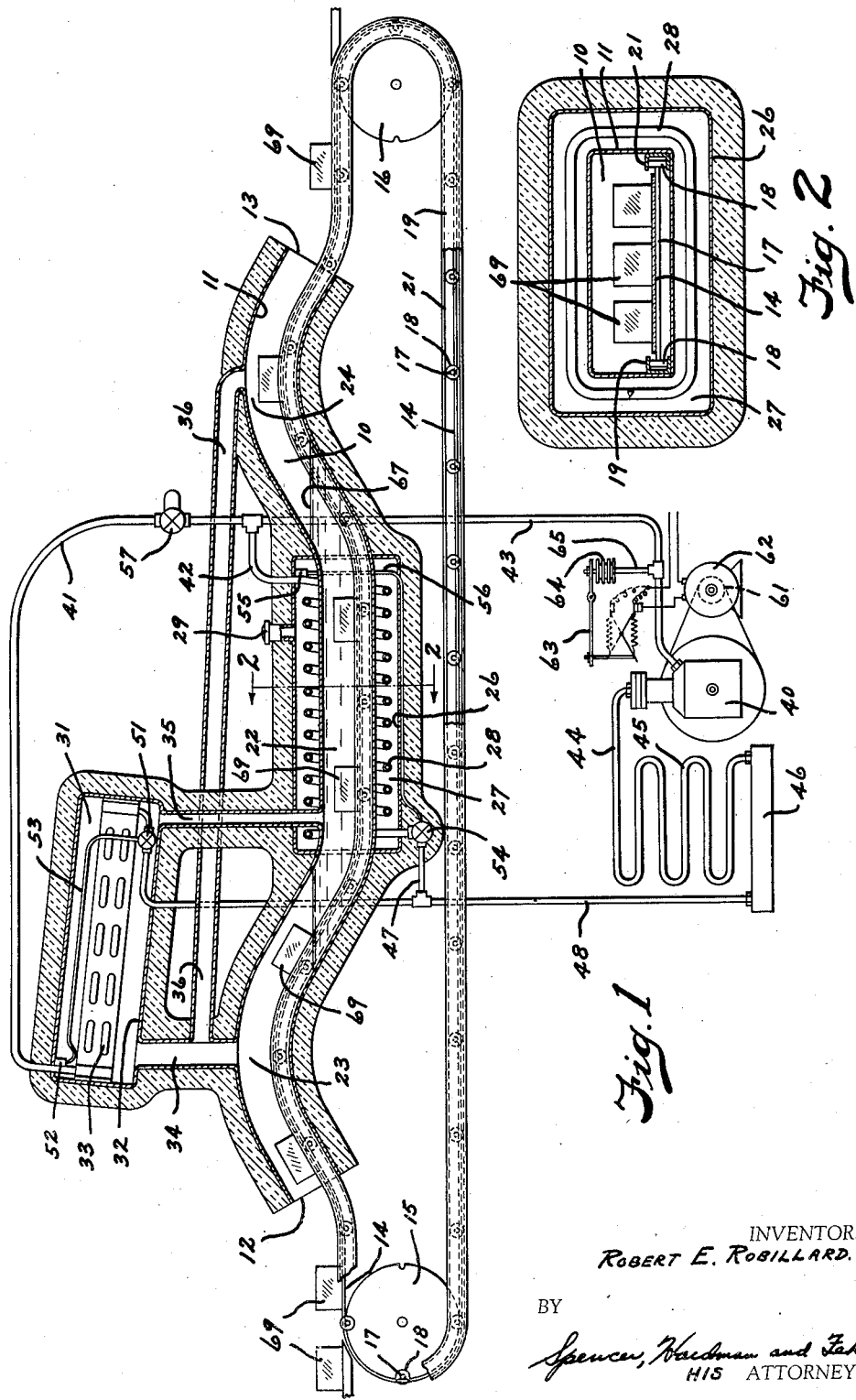

2,059,970

UNITED STATES PATENT OFFICE 2,059,970

REFRIGERATING APPARATUS

Robert E. Robillard, Dayton, Ohio, assignor to General Motors Corporation, Dayton, Ohio, a corporation of Delaware Application February 9, 1935, Serial No. 5,805

8 Claims. (Cl. 62—104)

The present invention relates to refrigeration and particularly to quick freezing refrigerating apparatus.

In refrigerating apparatus of the freezing type wherein articles to be frozen are conveyed through a freezing chamber prolonged freezing processes have been employed. These prolonged processes have not been entirely satisfactory for several reasons. The prolonged freezing processes known to me are not suitable for freezing articles which rapidly deteriorate or suffer disintegration either chemically or physically when exposed for a short period of time to temperatures other than very low temperatures. In addition the apparatus heretofore employed for obtaining the prolonged freezing processes of articles or comestibles have been constructed of such great length, to insure complete freezing of the articles before they leave the apparatus, that a special room or building is required to house the apparatus.

An object of the present invention is to provide a novel method of and an improved apparatus for quickly cooling articles to be frozen.

Another object of the present invention is to provide an improved refrigerating apparatus of the continuous conveyor type for progressively and quickly freezing articles.

A further object of the invention is to provide an improved refrigerating apparatus of the continuous conveyor type having means for rapidly precooling articles to be frozen before the articles are conveyed into the freezing chamber proper of the apparatus.

In carrying out the foregoing objects it is a still further object of the invention to provide an improved quick freezing device wherein articles are rapidly cooled and frozen by contacting the articles directly with a volatile liquid refrigerant which is vaporized, recondensed, recovered and used over again.

Further objects and advantages of the present invention will be apparent from the following description, reference being had to the accompanying drawing, wherein a preferred form of the present invention is clearly shown.

In the drawing:

Fig. 1 is a diagrammatic sectional view of an apparatus constructed in accordance with my invention; and Fig. 2 is a vertical sectional view of a portion of the apparatus disclosed in Fig. 1 and is taken on the lines 2—2 thereof.

Referring to the drawing, for the purpose of illustrating my invention, I have shown in Fig. 1 thereof a refrigerating apparatus of the continuous conveyor type. The apparatus may be supported in any suitable manner and includes a tunnel or passage 10, formed by a sleeve 11, and having open ends 12 and 13 respectively. A continuous conveyor belt 14 extends through the sleeve, forming the tunnel or passage 10, and around suitable driving wheels 15 and 16 respectively. The belt 14 carries a plurality of shafts 17 having rollers 18 mounted on the ends thereof. A pair of spaced apart tracks 19 and 21 extending continuously with belt 14 receive the rollers 18 and guide the belt 14 through the passage 10 during revolutions of the belt. The portion adjacent each end of sleeve 11 extends upwardly and thence downwardly to form a central horizontally extending pocket or trap portion 22 and upper pockets or traps 23 and 24 on each side of the pocket 22. The central pocket portion 22 of the device is enclosed or surrounded by a shell member 26 to provide a tank 27. A refrigerant evaporating conduit 28 of a closed refrigerating system is contained in the tank 27 and is coiled around the sleeve 11 at the pocket portion 22 thereof. Tank 27 has a capped filler opening 29 for permitting a brine or other suitable solution or substance to be put into the tank so as to serve as a temperature hold over medium for the refrigerant evaporating coil 28. A closed chamber 31 formed by the box-like member 32 has an evaporator 33 of a refrigerating system mounted therein. Chamber 31 communicates with the tunnel or passage 10 at three spaced apart points. For example, the conduit 34 permits communication of chamber 31 with the upper pocket or trap portion 23 of passage 10. A conduit 35 permits communication of chamber 31 with the lower pocket or trap portion 22 of passage 10. A third conduit 36 may communicate with chamber 31 and with the upper pocket or trap portion 24 of passage 10. In the present disclosure the conduit 36 extends upwardly from trap portion 24 and communicates with chamber 31 by way of the conduit 34. The passage 10, chamber 31, and the conduits 34, 35 and 36 may all be insulated by being enclosed in or surrounded by cork or any other suitable insulating material.

The closed refrigerating system connected with the evaporators or cooling units 28 and 33 includes a compressor 40 which withdraws evaporated refrigerant, such for example, as sulphur dioxide through conduits 41, 42 and 43 from the cooling units 28 and 33. The compressor 40 compresses the gaseous refrigerant and forwards same under pressure through conduit 44 to a condenser 45. The condenser 45 may be cooled in any suitable and well-known manner to cause the refrigerant therein to liquefy and flow to a receiver 46. The liquefied refrigerant collected in receiver 46 flows therefrom to the evaporators 28 and 33 through the conduits 47 and 48 respectively. An expansion device or valve 51 is provided in conduit 48 for controlling the flow of liquid refrigerant to evaporator 33. Valve 51 is actuated in response to a change in pressure of a volatile fluid sealed within thermostatic bulb 52 and pipe 53 connected with the valve. The change in pressure of the fluid in the thermostatic system is effected by changes in temperature of evaporator 33 since the bulb 52 is secured to the outlet pipe 41 adjacent this evaporator. Such control of the flow of refrigerant to an evaporator of a refrigerating system is common and well-known to those skilled in the art, and for this reason the temperature of the evaporator 28 is also illustrated as being controlled in this same manner. An expansion device or valve 54 is interposed in the pipe or conduit 47 leading to evaporator 28 and has a thermostatic bulb 55 secured to the outlet pipe 42 of the evaporator and connected to valve 54 by a pipe 56. A so-called two temperature pressure operated valve 57 of any conventional and well-known design is interposed in the gaseous return conduit 41 leading from evaporator 33 and this valve operates automatically to maintain a higher pressure in conduit 41 and evaporator 33 than in conduit 43 and evaporator 28. The valve 57 thereby permits evaporator 28 to produce a lower temperature than evaporator 33 since evaporator 33 is employed merely for condensing gaseous refrigerant. When either evaporator has been reduced to its predetermined low temperature the thermostatic system associated therewith closes the expansion valve also associated therewith to prevent a further reduction in temperature of the evaporator. On the other hand when the temperature of either evaporator increases beyond a predetermined degree the thermostatic system connected therewith opens the expansion valve to permit liquid refrigerant to flow into the evaporator. Compressor 40 of the refrigerating system is connected, through suitable belt and pulley means 61, to an electric motor 62. Operation of the motor 62 is controlled by a switch means 63 interposed in the power lines leading to the motor. The switch means 63 is actuated by expansion and/or contraction of a bellows 64 connected by pipe 65 to conduit 43 and responsive to pressures in the gaseous refrigerant return line of the system.

The trap or pocket portion 22 of tunnel or passage 10 is flooded or substantially flooded with a body of volatile liquid refrigerating fluid indicated at 67. In order to successively carry out the objects of the present invention this fluid must be substantially odorless, tasteless and completely non-toxic. Fluids of this type which are suitable for use in my apparatus are generally known as the halofluoro derivatives of the aliphatic hydrocarbons. Such fluids are fully described in the Reissue Patent No. 19,265 of August 7, 1934 to Thomas Midgley, Jr. et al. CHCl$_2$F CCl$_2$F$_2$, C$_2$Cl$_2$F$_4$ and CH$_2$ClF are specific examples of refrigerants suitable for use in my apparatus. Any of the refrigerants mentioned may be employed in my apparatus and CHCl$_2$F may be the preferable refrigerating fluid because this refrigerant remains in liquid form up to a temperature of about 50° F. at atmospheric pressure and with its use there is less likelihood of losing much, if any, of the fluid in the operation of my apparatus. Since the tunnel or passage 10 is completely flooded from the bottom to the top thereof with the volatile liquid refrigerant at the trap or pocket portion 22 it is obvious that articles conveyed through the apparatus will be brought into direct contact with or will be immersed in the volatile liquid refrigerant. Any articles or comestibles, either wrapped or unwrapped, such as meats, fish, berries, liquids, etc., may be transmitted or conveyed through the body of liquid refrigerant 67. For illustrating purposes I have indicated, by the reference character 69, a plurality of articles or comestibles to be progressively transmitted, by the conveyor system of my apparatus, into intimate association or direct contact with the volatile liquid refrigerant 67. It is to be understood that provisions may be made to drain or remove the liquid refrigerant 67 from the apparatus when the apparatus is not in use or when the refriegrating system is inoperative and to store the refrigerant in a closed container to thereby prevent loss thereof at temperatures above the boiling point of the refrigerant.

In the operation of my quick freezing apparatus the refrigerating system is rendered effective for causing the evaporators 28 and 32 to produce refrigeration to their respective predetermined temperatures. Thereafter the volatile liquid refrigerant 67 is placed in or circulated to the trap or pocket portion 22 in the tunnel 10. The below freezing temperature maintained by evaporator 28 in the trap portion 22 of tunnel 10 is sufficient to retain the refrigerant 67 in liquid form in the trap 22. The continuous belt 14 is rotated, by causing rotation in a clockwise direction of one of the driving wheels 15 or 16 in any suitable and well-known manner, and the articles or comestibles 69 to be frozen are placed on the belt 14 adjacent the end 12 of the apparatus. Rotation of belt 14 conveys or propels the articles 69 through the tunnel or passage 10. The comestibles or articles 69 are submerged in the body of liquid refrigerant 67 during travel thereof through the apparatus. It is to be understood that any suitable and well-known means may be employed to prevent flotation of the articles 69 in the refrigerant 67 and to hold the articles upon or against the belt 14 to insure movement or propelling thereof through the apparatus during travel of the belt. The articles 69 are of course very warm relative to the temperature of the body of liquid refrigerant 67 and when the articles enter the refrigerant 67 some of this refrigerant immediately vaporizes or gasifies upon absorbing heat from the articles. The gaseous vapor or evaporated refrigerant, upon cooling the articles 69, flows upwardly from the liquid body 67 to the upper trap or pocket portions 23 and 24 within the tunnel 10. The downwardly directed open ends 12 and 13 of tunnel or passage 10 prevents escape of the vaporized refrigerant from the apparatus. Vaporized refrigerant flowing to the traps 23 and 24 is directed by the conduits 34 and 36 upwardly into the chamber or compartment 31. The temperature of evaporator 33 causes the vaporized refrigerant upon entering chamber 31 to condense or liquefy. Refrigerant liquefied by the cooling effect of evaporator 33 flows downwardly over the sloping bottom wall of chamber 31 to the conduit 35 which conduit directs the liquid refrigerant back to the body 67 thereof in trap or pocket portion 22 of the tunnel 10. In this manner refrigerant vaporized by contact with and cooling of the articles 69 is recovered or reclaimed for use over again in the continuous operation of my apparatus. By submerging or conveying the articles 69 into or through the body of volatile liquid refrigerant 67 these articles will be quickly frozen in a relatively short passage and without prolonged cooling thereof. The articles 69 after having been frozen in the apparatus and progressively conveyed outwardly of the end 13 thereof are to be removed from the conveyor belt 14 and placed in suitable cold storage containers or compartments. In the arrangement of the apparatus disclosed the body of volatile liquid refrigerant 67 extends outwardly of the freezing trap portion 22 of tunnel 10 and the articles are substantially precooled prior to their entry into the low temperature freezing chamber portion 22 of the apparatus. It is preferred that at least the portions of sleeve 11 extending outwardly from each side of the freezing trap portion 22 of tunnel 10 and belt 14, rollers 18 and tracks 19 and 21 be made of material of poor conductivity so as to prevent conduction of heat to and from the freezing chamber portion of the tunnel 10.

It will be seen that I have provided an improved method of and apparatus for quickly freezing articles or comestibles without prolonged cooling thereof. Articles are frozen in my improved apparatus by direct contact with a volatile liquid refrigerant and this freezing operation requires very little time. My improved method of and apparatus for obtaining fast freezing of articles permits such apparatus to be constructed more compactly than apparatus heretofore employed and thus permits installation thereof in small rooms. The quick freezing obtained by my improved apparatus renders the frozen articles or comestibles more palatable than when such articles or comestibles are frozen by a prolonged process.

While the form of embodiment of the present invention as herein disclosed, constitutes a preferred form, it is to be understood that other forms might be adopted, all coming within the scope of the claims which follow.

What is claimed is as follows:

1. A refrigerating apparatus including a passage having an opening at each of its ends, said passage being constructed and arranged to form a plurality of pockets or traps between the ends thereof, a body of volatile liquid refrigerant within one of said pockets or traps, means for progressively conveying articles through said body of liquid refrigerant to vaporize a portion thereof and to cause the vaporized refrigerant to flow to another of said pockets or traps, means in heat exchange relation with said body of refrigerant to normally maintain same in a liquid state, and means for liquefying the vaporized refrigerant and for returning same to the body thereof in said passage.

2. A refrigerating apparatus including a passage having an opening at each of its ends, said passage being constructed and arranged to form a plurality of pockets or traps between the ends thereof, a body of volatile liquid refrigerant within one of said pockets or traps, means for progressively conveying articles through said body of liquid refrigerant to vaporize a portion thereof and to cause the vaporized refrigerant to flow to another of said pockets or traps, a chamber, a conduit communicating with said chamber and with said another of said pockets or traps for conducting the vaporized refrigerant to said chamber, means in heat exchange relation with said body of refrigerant to normally maintain same in a liquid state, means within said chamber for liquefying the vaporized refrigerant, and a conduit communicating with said chamber and with said one of said pockets or traps for conducting the refrigerant liquefied in said chamber to the body thereof in said passage.

3. A refrigerating apparatus including a passage having an opening at each of its ends, said passage being constructed and arranged to form a plurality of pockets or traps between the ends thereof, a body of volatile liquid refrigerant within one of said pockets or traps, means for progressively conveying articles through said body of liquid refrigerant to vaporize a portion thereof and to cause the vaporized refrigerant to flow to another of said pockets or traps, a chamber, a conduit communicating with said chamber and with said another of said pockets or traps for conducting the vaporized refrigerant to said chamber, an evaporator of a closed refrigerating system associated with said body of liquid refrigerant for cooling same, a second evaporator of a closed refrigerating system within said chamber for liquefying the vaporized refrigerant, and a conduit communicating with said chamber and with said one of said pockets or traps for conducting the refrigerant liquefied in said chamber to the body thereof in said passage.

4. In a refrigerating apparatus, a body of volatile liquid refrigerant, means in heat exchange relation with said body of refrigerant to normally maintain same in a liquid state, means for progressively conveying articles into said body of liquid refrigerant to cause vaporization of some of the liquid to thereby refrigerate the articles, and means for cooling and condensing the vaporized refrigerant and for returning the condensed vaporized refrigerant to said body of liquid refrigerant.

5. In a refrigerating apparatus, a body of volatile liquid refrigerant, means in heat exchange relation with said body of refrigerant to normally maintain same in a liquid state, means for progressively submerging comestibles in said body of liquid refrigerant to cause vaporization of some of the liquid to thereby refrigerate the comestibles, and means for cooling and condensing the vaporized refrigerant and for returning the condensed vaporized refrigerant to said body of liquid refrigerant.

6. In a refrigerating apparatus, a body of volatile liquid refrigerant, means in heat exchange relation with said body of refrigerant to normally maintain same in a liquid state, means for conveying comestibles into direct contact with said body of liquid refrigerant to cause vaporization of some of the liquid to thereby refrigerate the comestibles, and means for cooling and condensing the vaporized refrigerant and for returning the condensed vaporized refrigerant to said body of liquid refrigerant.

7. That step in the method of quick freezing by progressively conveying articles into a body of volatile liquid refrigerant to vaporize a portion of the refrigerant which consists in, refrigerating said body of liquid refrigerant to normally maintain same in a liquid state while the vaporized portion thereof is being liquefied, at substantially the same pressure at which the volatile liquid is vaporized, and returned to said liquid body.

8. In a refrigerating apparatus, a liquid body of a halofluoro derivative of an aliphatic hydrocarbon, means in heat exchange relation with said liquid body for normally maintaining same in a liquid state, means for progressively conveying articles into said liquid body to cause vaporization of some of the liquid to thereby refrigerate the articles, and means for cooling and condensing the vaporized hydrocarbon and for returning the condensed vaporized hydrocarbon to said liquid body thereof.

ROBERT E. ROBILLARD.